United States Patent
Lee et al.

(10) Patent No.: US 9,344,175 B2
(45) Date of Patent: May 17, 2016

(54) METHOD AND APPARATUS FOR DETERMINING NUMBER OF ANTENNAS IN MULTIPLE INPUT MULTIPLE OUTPUT (MIMO) COMMUNICATION SYSTEM

(71) Applicant: SAMSUNG ELECTRONICS CO., LTD., Suwon-si (KR)

(72) Inventors: Byung Moo Lee, Seoul (KR); Byung Chang Kang, Yongin-si (KR); Jong Ho Bang, Suwon-si (KR); Jin Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 13/917,842

(22) Filed: Jun. 14, 2013

(65) Prior Publication Data

US 2014/0011508 A1   Jan. 9, 2014

(30) Foreign Application Priority Data

Jul. 3, 2012   (KR) .................. 10-2012-0072302

(51) Int. Cl.
| | | |
|---|---|---|
| H03C 7/02 | (2006.01) | |
| H04B 1/00 | (2006.01) | |
| H04B 7/00 | (2006.01) | |
| H04B 7/06 | (2006.01) | |
| H04B 7/04 | (2006.01) | |
| H04B 7/08 | (2006.01) | |
| H04W 24/02 | (2009.01) | |

(52) U.S. Cl.
CPC ............ *H04B 7/0608* (2013.01); *H04B 7/0691* (2013.01); *H04B 7/0413* (2013.01); *H04B 7/0452* (2013.01); *H04B 7/061* (2013.01); *H04B 7/0606* (2013.01); *H04B 7/0632* (2013.01); *H04B 7/0697* (2013.01); *H04B 7/0802* (2013.01); *H04W 24/02* (2013.01)

(58) Field of Classification Search
CPC .......... H04B 7/00; H04B 1/04; H04B 7/0608; H04B 7/0417; H04B 7/0632; H04B 7/0697; H04B 7/0465; H04B 7/0691; H04B 7/061; H04B 7/0802; H04B 7/0689; H04B 17/26; H04B 7/0413; H04B 7/0452; H04B 7/0626; H04B 7/0822; H04L 27/06; H04W 52/42; H04W 52/8346; H04W 52/26; H04W 24/02
USPC ............ 455/452.1, 101, 63.4, 522, 127.1, 69, 455/422.1, 436, 63.1, 562.1; 375/349, 260, 375/341; 370/252, 319, 437; 343/709, 700
See application file for complete search history.

(56) References Cited

U.S. PATENT DOCUMENTS

| | | | |
|---|---|---|---|
| 7,280,840 B2 | 10/2007 | Murakami et al. | |
| 7,603,141 B2 * | 10/2009 | Dravida | ................. 455/562.1 |

(Continued)

FOREIGN PATENT DOCUMENTS

| | | |
|---|---|---|
| KR | 10-0557158 B1 | 3/2006 |
| KR | 10-0726340 B1 | 6/2007 |

(Continued)

*Primary Examiner* — Olumide T Ajibade Akonai
(74) *Attorney, Agent, or Firm* — NSIP Law

(57) ABSTRACT

A method of determining a number of antennas, includes calculating a power used by a transmitting device. The method further includes calculating a channel capacity of the transmitting device. The method further includes determining a number of antennas of the transmitting device to be used based on the power and the channel capacity.

19 Claims, 13 Drawing Sheets

(56) References Cited

U.S. PATENT DOCUMENTS

| | | |
|---|---|---|
| 7,831,232 B2 | 11/2010 | Nakaya |
| 8,798,120 B2 * | 8/2014 | de Veciana ............ H04B 7/0689 375/219 |
| 2004/0029533 A1 | 2/2004 | Matsuo et al. |
| 2005/0181739 A1 * | 8/2005 | Krasny ................... H04B 7/061 455/69 |
| 2009/0268835 A1 * | 10/2009 | Imai et al. ...................... 375/267 |
| 2010/0246496 A1 | 9/2010 | Yurugi et al. |
| 2010/0248656 A1 | 9/2010 | Zhou |
| 2011/0188586 A1 * | 8/2011 | Bidigare et al. .............. 375/260 |
| 2012/0014469 A1 | 1/2012 | Zhou |
| 2012/0027124 A1 | 2/2012 | Murakami et al. |
| 2012/0063341 A1 * | 3/2012 | Hamaguchi et al. .......... 370/252 |
| 2012/0063431 A1 | 3/2012 | Darwood et al. |
| 2012/0134441 A1 * | 5/2012 | Yokomakura .......... H04B 7/063 375/295 |

FOREIGN PATENT DOCUMENTS

| | | |
|---|---|---|
| KR | 10-2008-0043928 A | 5/2008 |
| KR | 10-0951330 B1 | 4/2010 |
| KR | 10-0967754 B1 | 7/2010 |
| KR | 10-2011-0014228 A | 2/2011 |
| KR | 10-2011-0025670 A | 3/2011 |
| KR | 10-1071803 B1 | 10/2011 |

* cited by examiner

METHOD AND APPARATUS FOR DETERMINING NUMBER OF ANTENNAS IN MULTIPLE INPUT MULTIPLE OUTPUT (MIMO) COMMUNICATION SYSTEM

CROSS-REFERENCE TO RELATED APPLICATION

This application claims the benefit under 35 U.S.C. §119 (a) of Korean Patent Application No. 10-2012-0072302, filed on Jul. 3, 2012, in the Korean Intellectual Property Office, the entire disclosure of which is incorporated herein by reference for all purposes.

BACKGROUND

1. Field

The following description relates to a method and apparatus for determining a number of antennas in a multiple input multiple output (MIMO) communication system.

2. Description of Related Art

A multiple input multiple output (MIMO) communication system may achieve a high performance efficiency by using a plurality of antennas in a transmitting device or a receiving device. The MIMO communication system may enhance a spectral efficiency and an energy efficiency simultaneously by installing a plurality of transmitting antennas.

When using the plurality of transmitting antennas installed, energy is consumed in a radio frequency (RF) chain connected to each of the plurality of transmitting antennas. Accordingly, a number of transmitting antennas used in communication may include a conflicting relationship with the energy efficiency, to a degree. Also, as the number of transmitting antennas rises, complexity and delay in a process of signal processing may increase.

A conventional method of selecting antennas may employ a variety of optimal/suboptimal schemes to be used to maximize the spectral efficiency, in a state in which a number of antennas to be used for communication is predetermined. For example, the conventional method of selecting antennas may calculate a most efficient combination by selecting antennas randomly from the predetermined number of antennas.

SUMMARY

In a general aspect, there is provided a method of determining a number of antennas, the method including calculating a power used by a transmitting device. The method further includes calculating a channel capacity of the transmitting device. The method further includes determining a number of antennas of the transmitting device to be used based on the power and the channel capacity.

In another general aspect, there is provided a method of determining a number of antennas, the method including extracting a parameter of a transmitting device and/or a parameter of a receiving device. The method further includes determining a number of antennas of the transmitting device to be used to maximize an efficiency of the transmitting device based on at least one of the parameters.

In still another general aspect, there is provided an apparatus that determines a number of antennas, the apparatus including a power calculating unit configured to calculate a power used by a transmitting device. The apparatus further includes a channel capacity calculating unit configured to calculate a channel capacity of the transmitting device. The apparatus further includes an antenna number determining unit configured to determine a number of antennas of the transmitting device to be used based on the power and the channel capacity.

In yet another general aspect, there is provided an apparatus that determines a number of antennas, the apparatus including a parameter extracting unit configured to extract a parameter of a transmitting device and a parameter of a receiving device. The apparatus further includes an antenna number determining unit configured to determine a number of antennas of the transmitting device to be used to maximize an efficiency of the transmitting device based on the parameters.

Other features and aspects will be apparent from the following detailed description, the drawings, and the claims.

DETAILED DESCRIPTION

Figure 1:
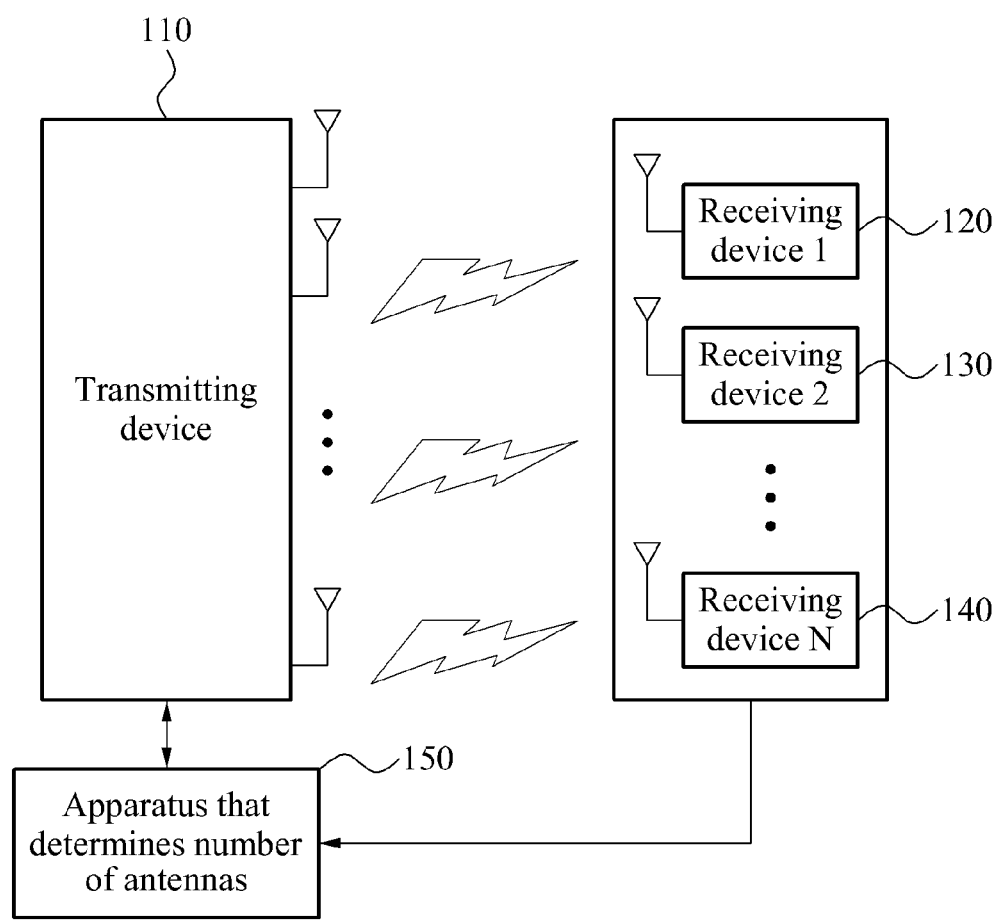
FIG. 1 is a diagram illustrating an example of a transmitting device, receiving devices, and an apparatus that determines a number of antennas.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a transmitting device 110, receiving devices 120 to 140, and an apparatus 150 that determines a number of antennas. Referring to FIG. 1, the transmitting device 110, the receiving devices 120 to 140, and the apparatus 150 are elements of a multiple input multiple output (MIMO) communication system.

The transmitting device 110 includes a plurality of antennas. The transmitting device 110 transmits data to each of the receiving devices 120 to 140 through the plurality of antennas. In more detail, the transmitting device 110 transmits data to each of the receiving devices 120 to 140 based on a number of the antennas to be used to maximize an energy efficiency while minimizing a decrease in a channel capacity, of the transmitting device 110. The number of the antennas to be used in communication is determined based on the energy efficiency as well as the channel capacity in the MIMO communication system. Accordingly, the MIMO communication system described herein may be appropriate for a next-generation system requiring an energy reduction.

Hereinafter, although each of the receiving devices 120 to 140 may be described as including a single antenna, each of the receiving devices 120 to 140 is not limited thereto, and may include a plurality of antennas. Also, a total number of the antennas of the transmitting device 110 may be greater than a number of the antennas of each of the receiving devices 120 to 140.

The apparatus 150 determines the number of antennas of the transmitting device 110 to be used to transmit data to the receiving devices 120 to 140. The apparatus 150 may exist independent of the transmitting device 110 or inside the transmitting device 110. In more detail, the apparatus 150 determines the number of the antennas of the transmitting device 110 to be used to maximize the energy efficiency, and may select randomly one or more antennas of the transmitting device 110 to be used that correspond to the determined number of the antennas, from among the total number of the antennas of the transmitting device 110. The apparatus 150 may be appropriate for a communication system requiring an energy reduction, and may decrease complexity and delay due to an increasing number of antennas to be used.

Figure 2:
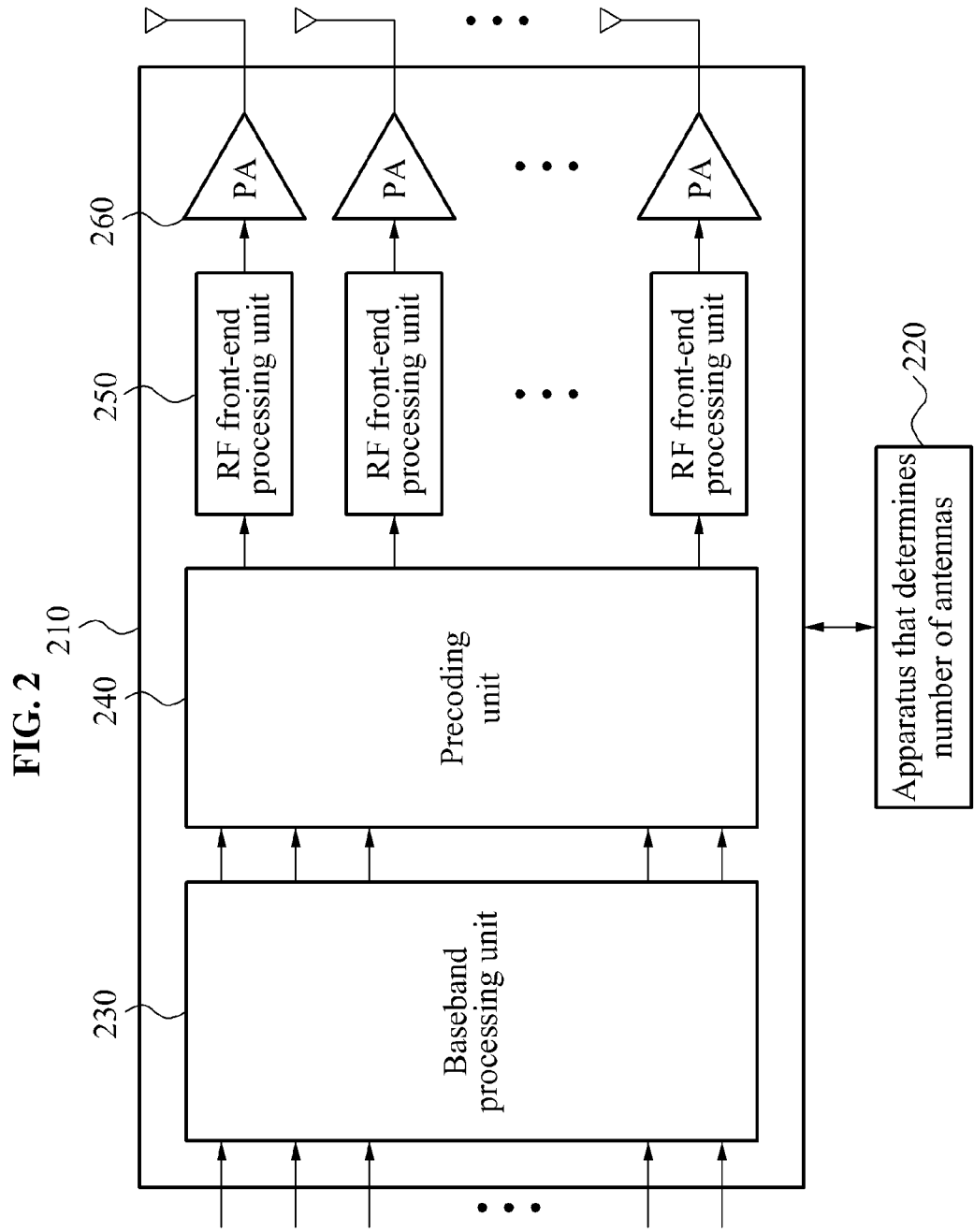
FIG. 2 is a diagram illustrating another example of a transmitting device.

FIG. 2 is a diagram illustrating another example of a transmitting device 210. Referring to FIG. 2, the transmitting device 210 is connected to an apparatus 220 that determines a number of antennas of the transmitting device 210 to be used in communication of a MIMO communication system. The transmitting device 210 includes a baseband processing unit 230, a precoding unit 240, radio frequency (RF) front-end processing units 250, and power amplifiers (PAs) 260.

The transmitting device 210 further includes an $N_t$ number of antennas, and a number of receiving devices of the MIMO communication system may be K. Also, a receiving device may include a single antenna. For example, the transmitting device 210 may correspond to a base station, and the receiving device may correspond to a user terminal.

The receiving device may receive a signal y from the transmitting device 210 that may be expressed as the following example of Equation 1:

$$y = \sqrt{P_{tx}} H \zeta F x + n \quad (1)$$

In Equation 1, y denotes a received K×1 signal vector. $P_{tx}$ denotes a total amount of power transmitted, and H denotes a Rayleigh channel matrix of K×$N_t$. $\zeta$ denotes a normalized vector of the total amount of the power transmitted, and $\zeta$ may be represented as $\zeta = \sqrt{N/K_r}$. F denotes a precoding matrix of $N_t$×K, and x denotes a K×1 message signal vector. n denotes a K×1 additive white Gaussian noise (AWGN) vector.

The baseband processing unit 230, the RF front-end processing units 250, and the PAs 260 perform functions known to one of ordinary skill in the art, so further description thereof will be omitted for conciseness. The precoding unit 240 precodes a signal to be transmitted to reduce an amount of interference between the receiving devices. For example, the precoding may include matched filtering (MF) precoding ($F = N_t^- H^H$) and zero-forcing (ZF) precoding ($F = H^H (HH^H)^{-1}$).

To maximize an energy efficiency in the MIMO communication system, an energy efficiency (EE) of the transmitting device 210 may be maximized. The EE may be defined based on a sum power model that may be determined by the following example of Equation 2:

$$P_{sum} = P_{PA} + P_{BB} + N_t P_{RFfront} \quad (2)$$

In Equation 2, $P_{sum}$ denotes a sum power of the transmitting device 210, and $P_{PA}$ denotes an amount of power used by the PAs 260. $P_{BB}$ denotes an amount of power used by the baseband processing unit 230, and $P_{RFfront}$ denotes an amount of power used by the RF front-end processing units 250. Each of the RF front-end processing units 250 may include a mixer, a filter, and a digital to analog converter (DAC). Accordingly, P RFfront may denote an amount of power used by the mixer, the filter, and the DAC.

To maximize the EE, a power $P_c$ may be expressed as the following example of Equation 3:

$$P_c = (P_{BB}/N_t + P_{RFfront}) \quad (3)$$

By using Equation 3, Equation 2 may be simplified to the following example of Equation 4:

$$P_{sum} = P_{PA} + N_t P_c \quad (4)$$

A relationship between the total amount of the power $P_{tx}$ transmitted and the amount of the power $P_{PA}$ used by the PAs 260 may be expressed as the following example of Equation 5:

$$P_{tx} = \eta P_{PA} \quad (5)$$

In Equation 5, $\eta$ denotes an efficiency of the PAs 260. For example, referring to FIGS. 9 to 13, when a bandwidth (BW) is 10 megahertz (MHz), an orthogonal frequency division multiplexing (OFDM) system includes 1024 subcarriers, an input-backoff (IBO) is 11 decibels (dB), and each of the PAs 260 is Class-B, $\eta$ may be 22%.

Since the transmitting device 210 includes a plurality of antennas, a large scale (LS) MIMO baseband (BB) computation model x(Gflops) may be used to calculate the amount of the power $P_{BB}$ used by the baseband processing unit 230 that may be expressed as the following example of Equation 6:

$$\chi = N_t B \cdot \left[ \left(\frac{T_u}{T_s}\right) \log_2(T_u B) + \left(\frac{T_u}{T_s}\right)\left(1 - \frac{T_p}{T_{sl}}\right) K + \left(\frac{T_u}{T_s}\right)\left(\frac{T_p}{T_{sl}}\right) \log_2\left(\frac{T_u T_p}{T_s T_d}\right) + \left(\frac{T_d}{T_{sl}}\right) K^2 \right] \quad (6)$$

In Equation 6, parameters are denoted as in the following example of Table 1:

| Parameters | Description | Power consumption |
|---|---|---|
| B | Bandwidth | 10 MHz |
| $T_{sl}$ | Slot length | 1 ms |
| $T_p$ | Pilot length in one slot | 0.427 ms |
| $T_s$ | Symbol duration | 71.4 us |
| $T_g$ | Guard Interval (GI) | 4.7 us |
| $T_u$ | Symbol without GI | 66.7 us |
| $T_d$ | Delay spread | 4.7 us |

Using Equation 6, the amount of the power $P_{BB}$ used by the baseband processing unit 230 may be expressed as the following example of Equation 7:

$$P_{BB} = \frac{\chi(Gflops)}{\varrho(Gflops/W)} \quad (7)$$

In Equation 7, W denotes a Lambert W function. Denominator of Equation 7 denotes VLSI(Very Large Scale Integration) computational efficiency, which can be represented as Gflop/W (Gia flop per Watt).

A received signal $y_k$ of a k-th receiving device among the receiving devices may be expressed as the following example of Equation 8:

$$yk = \sqrt{\frac{P_{tx}N_t}{K}}\, h_{k,:} f_{:,k} x_k + n_k + \sqrt{\frac{P_{tx}N_t}{K}} \sum_{l \neq k} h_{k,:} f_{:,l} x_l \quad (8)$$

In Equation 8, $h_{k,l}$ denotes a 1×$N_t$ channel vector of the k-th receiving device, and $f_{z,kXk}$ denotes an $N_t$×1 precoding vector of the k-th receiving device. Also, $n_k$ denotes a noise of the k-th receiving device.

In an example of a single independent cell, using Equation 8, a channel capacity C of the transmitting device 210 may be determined by the following example of Equation 9:

$$C = \alpha B \cdot \sum_{k=1}^{K} E\left[ \log_2\left(1 + \frac{\frac{P_{tx}N_t}{K}|h_{k,:} f_{:,k}|^2}{\frac{P_{tx}N_t}{K}\left|\sum_{l \neq k} h_{k,:} f_{:,l}\right|^2 + N_0 B}\right)\right] \quad (9)$$

In Equation 9, $\alpha$ denotes a scaling factor utilizing a pilot overhead and an OFDM guard band. $N_0 B$ denotes a noise power in a given bandwidth B of a signal transmitted by the transmitting device 210. E[ ] denotes the expectation.

As described above, when the number of the antennas of the transmitting device 210 is greater than a number of antennas of the receiving devices, for example, $N_t$>10K, Equation 9 may be simplified to the following example of Equation 10:

$$C_{approx}^{LS-MIMO} \approx \alpha BK \cdot \left[\log_2\left(1 + \frac{P_{tx}N_t}{(I+N_0 B)K}\right)\right] \quad (10)$$

In Equation 10, I denotes an amount of interference between the receiving devices. The amount of the interference between the receiving devices may be removed by precoding.

Based on the sum power and the channel capacity of the transmitting device 210, the EE may be expressed by the following example of Equation 11:

$$EE = C/P_{sum} \quad (11)$$

Using Equation 11, a number of antennas of the transmitting device 210 to be used to maximize the EE of the transmitting device 210 may be derived from the following example of Equation 12:

$$\frac{\partial}{\partial N_t} EE \approx \frac{\partial}{\partial N_t}\left(\frac{C_{approx}}{\frac{1}{\eta}P_{tx} + N_t P_c}\right) \quad (12)$$

$$= \frac{BKP_{tx}}{K(N_0 B + I)\left(1 + \frac{N_t P_{tx}}{K(N_0 B + I)}\right)P_{sum}\log_2 e} -$$

$$\frac{BKP_c \cdot \log_e\left(1 + \frac{N_t P_{tx}}{K(N_0 B + I)}\right)}{P_{sum}^2 \log_2 e}$$

$$= 0$$

When $N_t^{opt}$ denotes the number of antennas of the transmitting device 210 to be used to maximize the EE of the transmitting device 210, $N_t^{opt}$ may need to satisfy Equation 12. An approximate value of $N_t^{opt}$ that satisfies Equation 12 may be determined by the following example of Equation 13:

$$N_t^{opt} \approx \frac{K(N_0 B + I)}{P_{tx}}(-1 + \exp(1 + W(\Gamma))) \quad (13)$$

In Equation 13, $\Gamma$ may be expressed by the following example of Equation 14:

$$\Gamma = W(\Gamma)\exp(W(\Gamma)) \quad (14)$$

In Equation 14, $\Delta$ may be expressed by the following example of Equation 15:

$$\Gamma = \frac{\frac{P_{tx}^2}{\eta} - KN_0 BP_c - KIP_c}{K(I + N_0 B)P_c \exp(1)} \quad (15)$$

As shown in Equation 12 and Equation 13, the number $N_t^{opt}$ of the antennas of the transmitting device 210 to be used to maximize the EE of the transmitting device 210 may be determined based on various parameters of the transmitting device 210 or the receiving devices. For example, the number $N_t^{opt}$ of the antennas of the transmitting device 210 to be used to maximize the EE of the transmitting device 210 may be determined based on the total amount of the power $P_{tx}$ transmitted, the number K of the receiving devices included in a cell coverage area of the transmitting device 210, the number of the antennas of the receiving devices, the bandwidth B of the signal transmitted by the transmitting device 210, the amount of the power $P_{RFfront}$ used by the RF front-end processing units 250, the amount of the power $P_{BB}$ used by the baseband processing unit 230, the amount of the interference I between the receiving devices, the amount of the power $P_{PA}$ used by the PAs 260, the amount of the sum power $P_{sum}$ used by the transmitting device 210, the efficiency $\eta$ of the PAs 260, the noise power $N_0 B$ in the given bandwidth B, and/or other parameters known to one of ordinary skill in the art.

The aforementioned various parameters may vary based on a state of the MIMO communication system. For example, the number K of the receiving devices may be variable, in a form of a random function. In another example, when carrier aggregation technology and cognitive radio technology are applied, the bandwidth B of the signal transmitted by the transmitting device 210 may vary periodically. Accordingly, the number $N_t^{opt}$ of the antennas of the transmitting device 210 to be used to maximize the EE of the transmitting device 210 may also vary based on a change of the various parameters.

When the transmitting device 210 is a base station, the transmitting device 210 may receive the aforementioned various parameters periodically from the receiving devices. In this example, the apparatus 220 that determines the number of the antennas may receive the parameters periodically from the receiving devices, and may adjust the number $N_t^{opt}$ of the antennas of the transmitting device 210 to be used to maximize the EE of the transmitting device 210 based on the received parameters, despite being in a state in which the parameters may vary.

Further, the apparatus 220 that determines the number of antennas may store the number $N_t^{opt}$ of the antennas of the transmitting device 210 to be used to maximize the EE of the transmitting device 210 and corresponding parameter(s) in a lookup table. Accordingly, the apparatus 220 may transmit, to the transmitting device 210, the number $N_t^{opt}$ of the antennas that corresponds to the parameter(s) in the lookup table.

A channel capacity $C\{q_1, q_2, \ldots q_{N_t^{opt}}\}$ of the transmitting device 210 may be determined based on the number $N_t^{opt}$ of the antennas of the transmitting device 210 to be used to maximize the EE of the transmitting device 210 when a $\{q_1, q_2, \ldots, q_{N_t^{opt}}\}$-th row is selected in a channel, as expressed by the following example of Equation 16:

$$C_{\{q_1,q_2,\ldots,q_{N_t^{opt}}\}} = \qquad (16)$$

$$\alpha B \cdot \sum_{k=1}^{K} E\left[\log_2\left(1 + \frac{\left|\frac{P_{tx}N_t}{K} h_{k,\{q_1,q_2,\ldots,q_{N_t^{opt}}\}} f_{\{q_1,q_2,\ldots,q_{N_t^{opt}}\},k}\right|^2}{\frac{P_{tx}N_t}{K}\left|\sum_{l\neq k} h_{k,\{q_1,q_2,\ldots,q_{N_t^{opt}}\}} f_{\{q_1,q_2,\ldots,q_{N_t^{opt}}\}}\right|^2 + N_0 B}\right)\right]$$

In Equation 16, $h_k, \{q_1, q_2, \ldots, q_{N_t^{opt}}\}$ denotes a $1 \times N_t^{opt}$ channel vector of the k-th receiving device, and $f\{q_1, q_2, \ldots, q_{N_t^{opt}}\}$ denotes an $N_t^{opt} \times 1$ precoding vector of the k-th receiving device.

A conventional method of selecting an antenna of a transmitting device may include selecting an antenna of the transmitting device to maximize a channel capacity of the transmitting device. A method of selecting an antenna of the transmitting device 210 that is described herein includes selecting an antenna of the transmitting device 210 to maximize the EE of the transmitting device 210. However, since the sum power $P_{sum}$ becomes consistent, that is, a constant value, when the number $N_t^{opt}$ of the antennas of the transmitting device 210 to be used to maximize the EE of the transmitting device 210 is determined, the maximized channel capacity may be related to the maximized EE.

For example, an optimal selection of one or more antennas of the transmitting device 210 to maximize the EE that correspond to the number $N_t^{opt}$ of the antennas of the transmitting device 210 to be used to maximize the EE of the transmitting device 210, may need to satisfy the following example of Equation 17:

$$\{q_1^{opt}, q_2^{opt}, \ldots, q_{N_t^{opt}}^{opt}\} = \operatorname{argmax}_{\{q_1,q_2,\ldots,q_{N_t^{opt}} \in Q\}} \frac{C_{\{q_1,q_2,\ldots,q_{N_t^{opt}}\}}}{P_{sum}} \qquad (17)$$

In Equation 17, Q denotes a total number of combinations configurable by the number $N_t^{opt}$ of the antennas of the transmitting device 210 to be used to maximize the EE of the transmitting device 210, among a total number $N_t^{total}$ of the antennas of the transmitting device 210.

Complexity of selecting the antennas of the transmitting device 210 to maximize the EE may be expressed as $$\binom{N_t^{total}}{N_t^{opt}},$$

and the complexity and delay of selecting the antennas may increase as the number $N_t^{opt}$ of the antennas of the transmitting device 210 to be used in communication rises. Accordingly, with the rise in the number $N_t^{opt}$ of the antennas of the transmitting device 210 to be used in communication, a probability of an issue to occur in the MIMO communication system may increase.

However, as shown in Equation 10, when the number $N_t^{opt}$ of the antennas of the transmitting device 210 to be used in communication increases, the channel capacity may be converged to a constant value, irrespective of a method of selecting an antenna of the transmitting device 210. Using such a characteristic, a random selection of one or more antennas of the transmitting device 210 may guarantee an optimal performance of the antenna.

In more detail, when a number $N_t^{sel}$ of the antennas of the transmitting device 210 is selected, and $N_t^{sel}$ is greater than or equal to a predetermined threshold $N_t^{th}$, for example, $N_t^{th} \approx 10K$, channel capacity of the transmitting device 210 when the number $N_t^{sel}$ of the antennas is selected optimally to maxmize the EE may become similar to a channel capacity of the transmitting device 210 when the number $N_t^{sel}$ of the antennas is selected randomly. This relationship may be expressed by the following example of Equation 18:

$$C_{q_1^{opt},q_2^{opt},\ldots,q_{N_t^{sel}}^{opt}}^{LS-MIMO} \approx C_{\{q_1^{rand},q_2^{rand},\ldots,q_{N_t^{sel}}^{rand}\}}^{LS-MIMO} \qquad (18)$$

$$= \alpha BK \cdot \left[\log_2\left(1 + \frac{P_{tx}N_t^{sel}}{(I+N_0 B)K}\right)\right],$$

$$N_t^{sel} \geq N_t^{th}$$

In Equation 18, $$C_{\{q_1^{opt},q_2^{opt},\ldots,q_{N_t^{sel}}^{opt}\}}^{LS-MIMO}$$

denotes the channel capacity when the number $N_t^{sel}$ of the antennas of the transmitting device 210 is selected optimally to maximize the EE, and $$C^{LS\text{-}MIMO}_{\{q_1^{rand}, q_2^{rand}, \ldots, q_{N_t^{sel}}^{rand}\}}$$

denotes the channel capacity when the number $N_t^{sel}$ of the antennas of the transmitting device 210 is selected randomly.

Accordingly, when the number $N_t^{opt}$ of the antennas of the transmitting device 210 to be used to maximize the EE of the transmitting device 210 is greater than the predetermined threshold $N_t^{th}$, the apparatus 220 that determines the number of the antennas selects randomly one or more antennas of the transmitting device 210 to be used in communication that correspond to the number $N_t^{opt}$ of the antennas, from among the total number $N_t^{total}$ of the antennas. This random selection of the antennas may maximize the EE, and may prevent an occurrence of complexity and delay involved in selecting the antennas. Also, a channel capacity of the transmitting device 210 when the antennas are selected randomly may be similar to a channel capacity of the transmitting device 210 when the antennas are selected optimally, despite the random selection.

Figure 3:
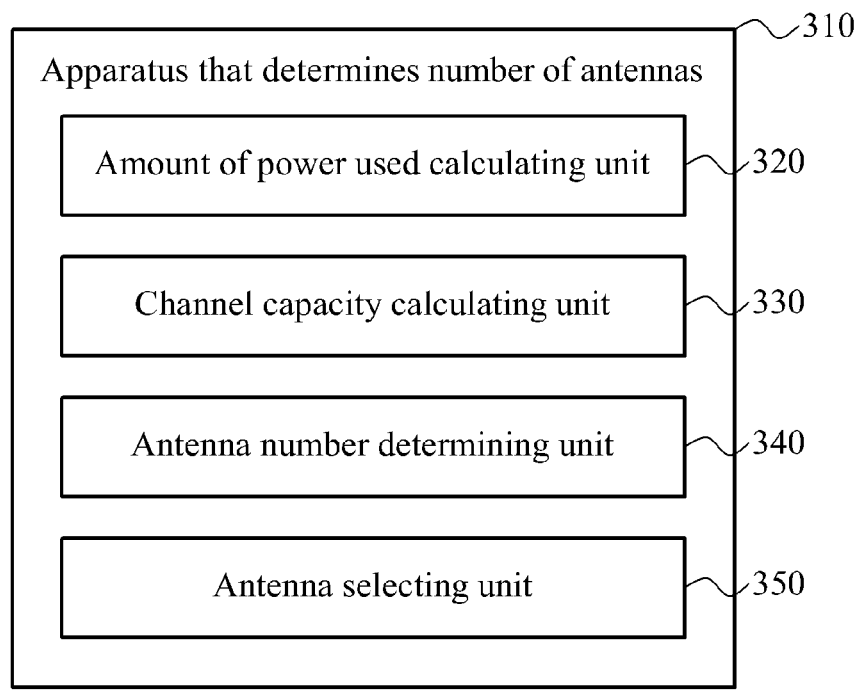
FIG. 3 is a diagram illustrating another example of an apparatus that determines a number of antennas.

FIG. 3 is a diagram illustrating another example of an apparatus 310 that determines a number of antennas. Referring to FIG. 3, the apparatus 310 that determines the number of the antennas includes an amount of power used calculating unit 320, a channel capacity calculating unit 330, an antenna number determining unit 340, and an antenna selecting unit 350. The apparatus 310 that determines the number of the antennas performs a method of determining the number of the antennas as illustrated in FIG. 5.

Figure 5:
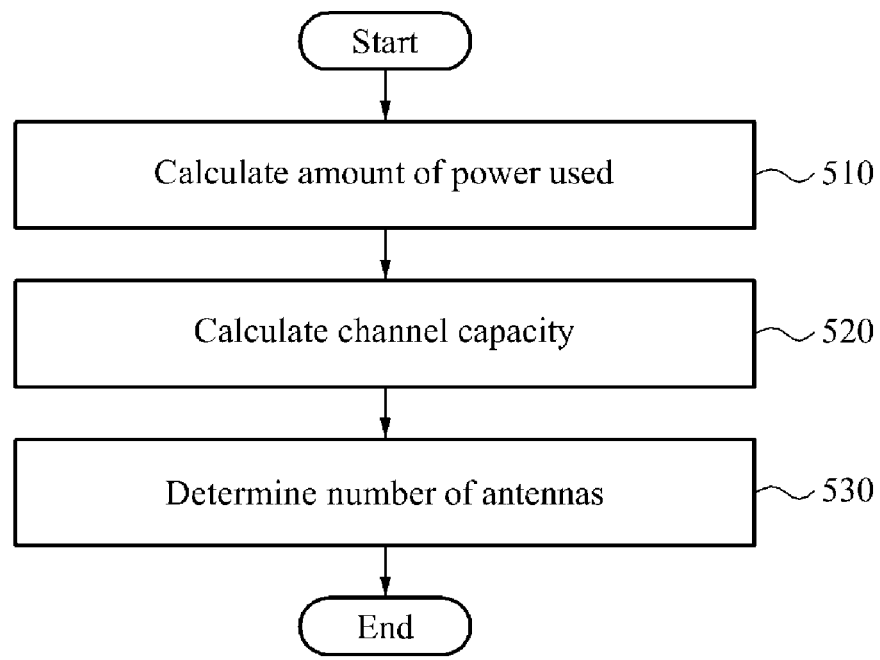
FIG. 5 is a flowchart illustrating an example of a method of determining a number of antennas.

FIG. 5 is a flowchart illustrating an example of a method of determining a number of antennas. Referring to FIG. 5, in operation 510, the amount of power used calculating unit 320 calculates an amount of power used by a transmitting device. The amount of power used by the transmitting device may include an amount of power used by a baseband processing unit, one or more RF front-end processing units, and one or more PAs, of the transmitting device. The amount of the power used by the RF front-end processing units may include an amount of power used by a mixer, a transmitting filter, and a DAC, of each of the RF front-end processing units.

In operation 520, the channel capacity calculating unit 330 calculates a channel capacity of the transmitting device. The channel capacity calculating unit 330 may calculate the channel capacity of the transmitting device based on a signal to interference plus noise ratio (SINR) of a receiving device corresponding to the transmitting device. The SINR of the receiving device may be determined based on a total amount of power transmitted by the transmitting device, a number of antennas of the transmitting device, a channel vector of the receiving device, a bandwidth of a signal transmitted by the transmitting device, a noise power corresponding to the receiving device and in the given bandwidth, and/or a precoding vector of the receiving device.

In operation 530, the antenna number determining unit 340 determines the number of the antennas of the transmitting device to be used to maximize an EE of the transmitting device based on the amount of the power used by the transmitting device and the channel capacity of the transmitting device.

For any descriptions omitted in FIGS. 3 and 5, reference may be made to FIG. 2. Also, the apparatus 310 that determines the number of the antennas may perform a method of selecting an antenna as shown in FIG. 7 or 8.

Figure 7:
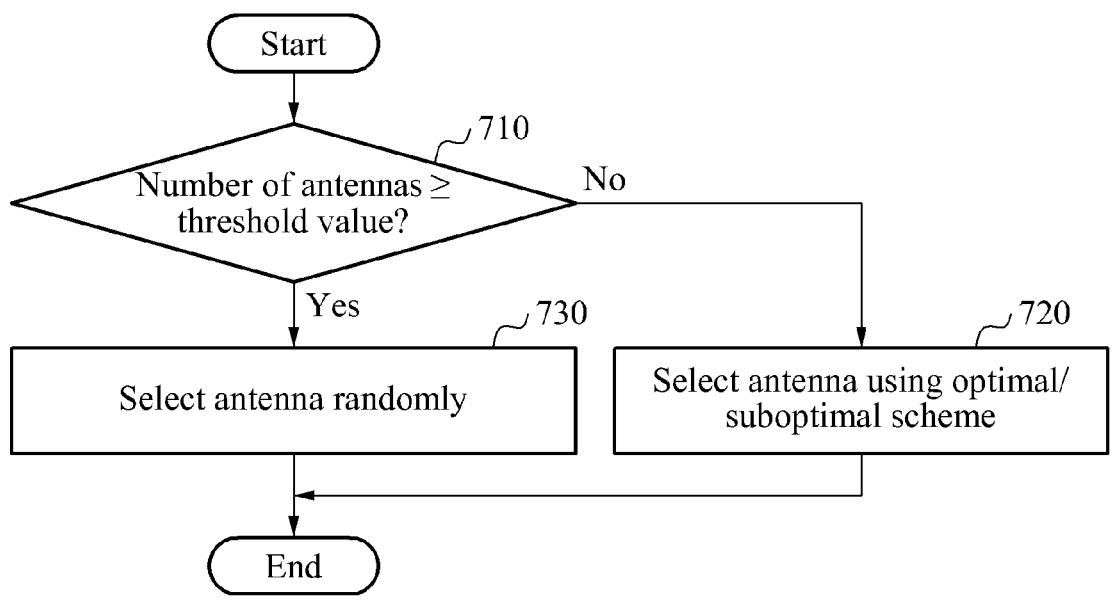
FIG. 7 is a flowchart illustrating an example of a method of selecting an antenna.
Figure 8:
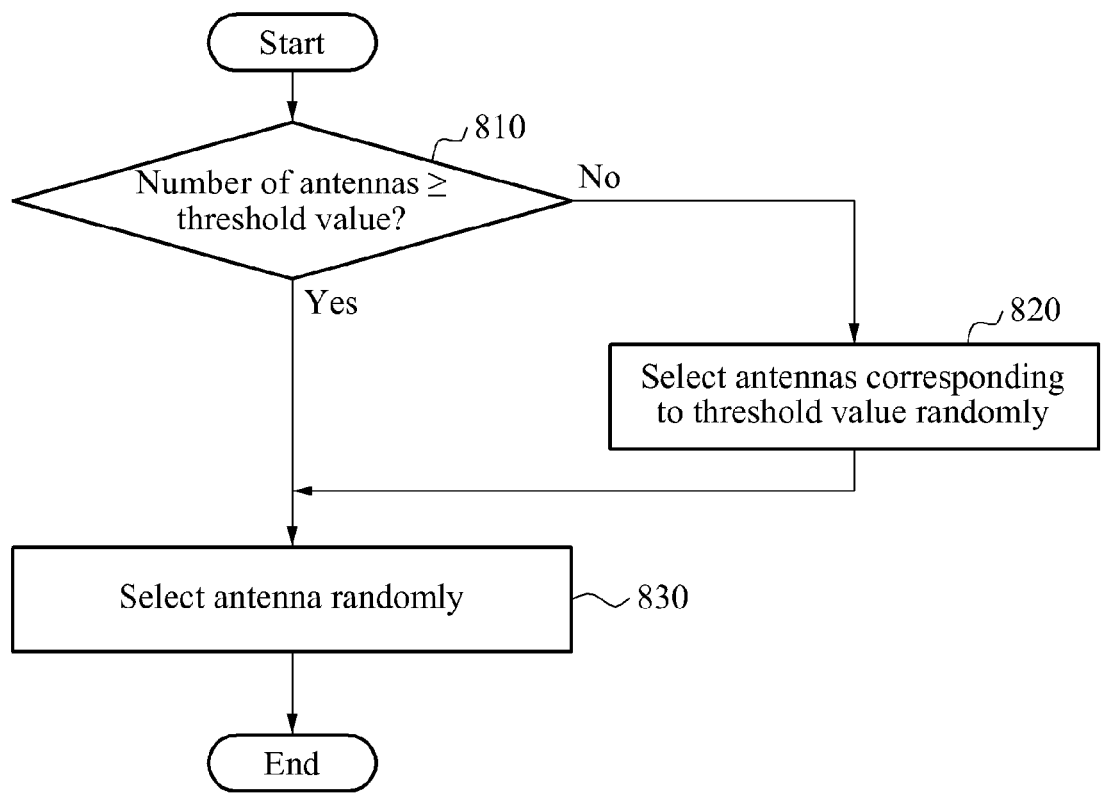
FIG. 8 is a flowchart illustrating another example of a method of selecting an antenna.

FIG. 7 is a flowchart illustrating an example of a method of selecting an antenna when a predetermined threshold value is relatively low. The predetermined threshold value includes a number of antennas of a transmitting device that is set by a system designer based on an amount of power used, or delay, in a process of calculating an amount of power used by the transmitting device, a channel capacity of the transmitting device, the EE of the transmitting device, and/or other parameters described above.

In operation 710, the antenna selecting unit 350 determines whether a number of antennas of the transmitting device to be used to maximize the EE that is determined by the antenna number determining unit 340, is greater than or equal to the predetermined threshold value. If the number of the antennas of the transmitting device to be used to maximize the EE is less than the predetermined threshold value, the method continues in operation 720. Otherwise, the method continues in operation 730.

In operation 720, the antenna selecting unit 350 selects an antenna of the transmitting device to be used from among a total number of antennas of the transmitting device, using an optimal or suboptimal scheme. That is, the antenna selecting unit 350 selects optimally one or more antennas of the transmitting device to be used to maximize the EE that correspond to the determined number of the antennas of the transmitting device to be used to maximize the EE, from among the total number of the antennas of the transmitting device.

In operation 730, the antenna selecting unit 350 selects an antenna of the transmitting device to be used, randomly from among the total number of the antennas of the transmitting device. That is, the antenna selecting unit 350 selects randomly one or more antennas of the transmitting device to be used that correspond to the determined number of the antennas of the transmitting device to be used to maximize the EE, from among the total number of the antennas of the transmitting device.

FIG. 8 is a flowchart illustrating an example of a method of selecting an antenna when a predetermined threshold is relatively high. The predetermined threshold value includes a number of antennas of a transmitting device for which an effect of the method is offset due to complexity and delay in a calculating process.

In operation 810, the antenna selecting unit 350 determines whether a number of antennas of the transmitting device to be used to maximize the EE that is determined by the antenna number determining unit 340, is greater than or equal to the predetermined threshold value. If the number of the antennas of the transmitting device to be used to maximize the EE is less than the predetermined threshold value, the method continues in operation 820. Otherwise, the method continues in operation 830.

In operation 820, the antenna selecting unit 350 selects one or more antennas of the transmitting device to be used that corresponds to the predetermined threshold value randomly from among a total number of antennas of the transmitting device.

In operation 830, the antenna selecting unit 350 selects an antenna of the transmitting device to be used, randomly from the total number of the antennas of the transmitting device. That is, the antenna selecting unit 350 selects randomly one or more antennas of the transmitting device to be used that correspond to the determined number of the antennas of the transmitting device to be used to maximize the EE, from among the total number of the antennas of the transmitting device.

Figure 4:
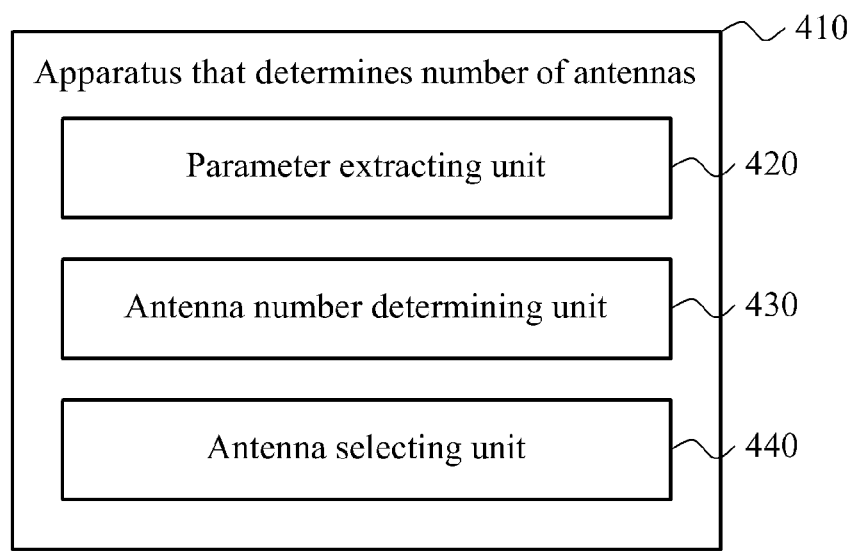
FIG. 4 is a diagram illustrating still another example of an apparatus that determines a number of antennas.

FIG. 4 is a diagram illustrating still another example of an apparatus 410 that determines a number of antennas. Referring to FIG. 4, the apparatus 410 that determines the number of the antennas includes a parameter extracting unit 420, an antenna number determining unit 430, and an antenna selecting unit 440. The apparatus 410 that determines the number of the antennas performs a method of determining the number of the antennas of FIG. 6.

Figure 6:
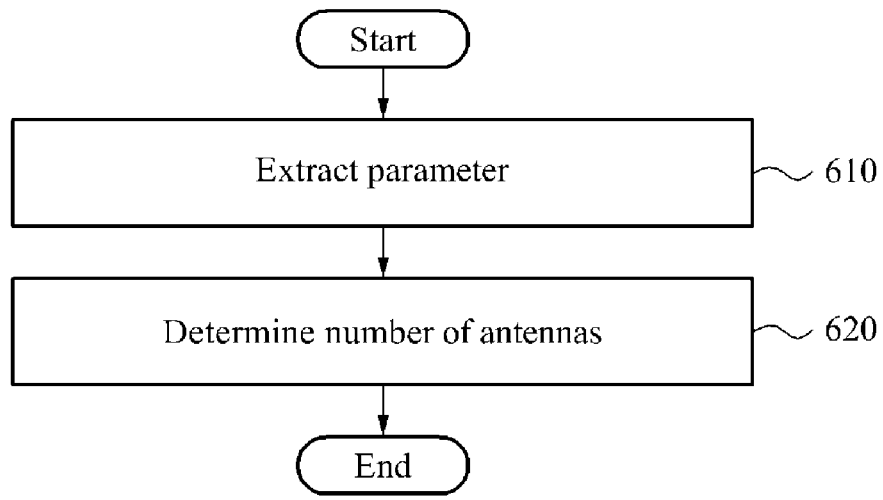
FIG. 6 is a flowchart illustrating another example of a method of determining a number of antennas.

FIG. 6 is a flowchart illustrating another example of a method of determining a number of antennas. Referring to FIG. 6, in operation 610, the parameter extracting unit 420 extracts at least one parameter of a transmitting device including a plurality of antennas, and at least one parameter of a receiving device including a plurality of antennas. The parameter extracting unit 420 may receive and update the parameters of the transmitting device and the receiving device periodically.

In operation 620, the antenna number determining unit 430 determines a number of the antennas of the transmitting device to be used to maximize an EE of the transmitting device based on the parameters extracted by the parameter extracting unit 420. For example, the antenna number determining unit 430 may determine the number of the antennas of the transmitting device to be used to maximize the EE based on a total amount of power transmitted by the transmitting device, a number of receiving devices included in a cell coverage area of the transmitting device, a number of antennas of the receiving device, a bandwidth of a signal transmitted by the transmitting device, an amount of power used by one or more RF front-end processing units of the transmitting device, an amount of power used by a device baseband processing unit of the transmitting device, an amount of interference between the receiving devices, an amount of power used by one or more power amplifiers of the transmitting device, an amount of sum power used by the transmitting device, an efficiency of the power amplifiers, a noise power in the given bandwidth, and/or other parameters known to one of ordinary skill in the art. In this example, the antenna number determining unit 430 may extract the number of the antennas that corresponds to the parameters of the transmitting device and the receiving device, from a lookup table.

For any descriptions omitted in FIGS. 4 and 6, reference may be made to FIG. 2. Also, the apparatus 410 that determines the number of the antennas may perform the method of selecting the antenna as shown in FIG. 7 or 8. That is, an operation of the antenna selecting unit 440 may be identical to an operation of the antenna selecting unit 350 of FIG. 3. Accordingly, further description of the antenna selecting unit 440 is omitted for conciseness.

Figure 9:
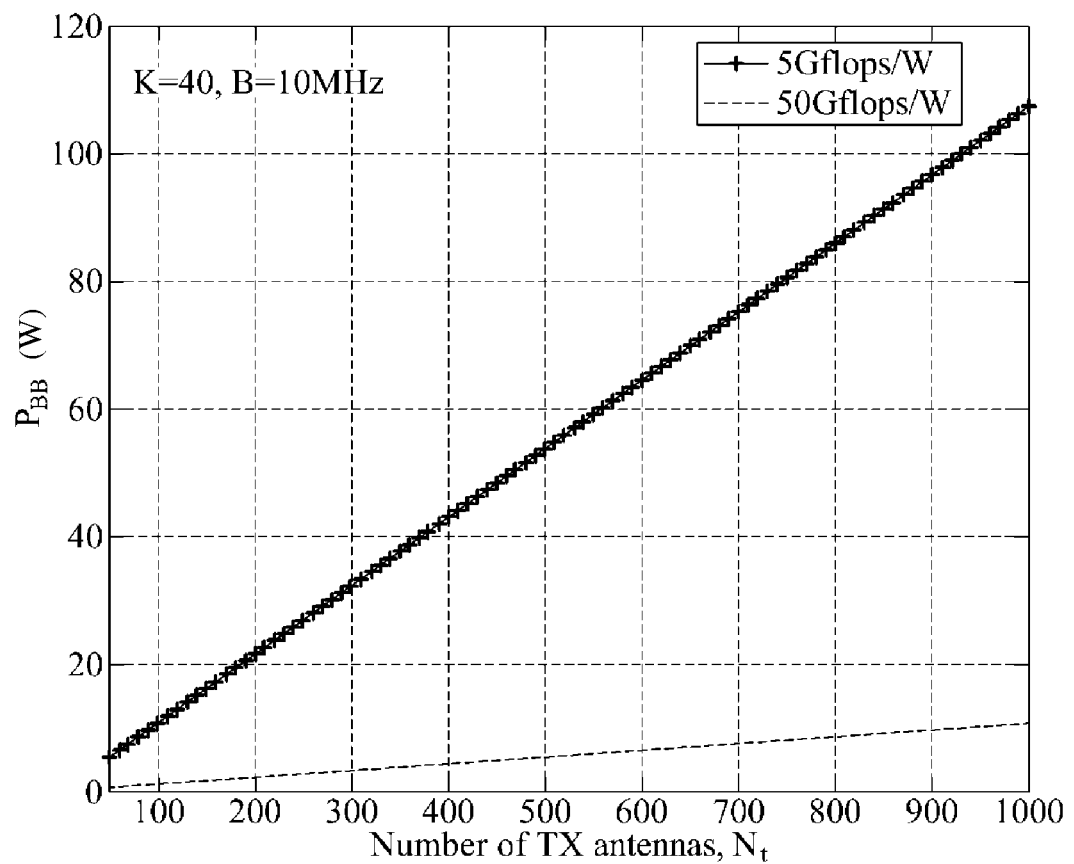
FIG. 9 is a graph illustrating an example of an amount of power used by a baseband processing unit and based on an increasing number of antennas.

FIG. 9 is a graph illustrating an example of an amount of power used by a baseband processing unit and based on an increasing number of antennas. Referring to FIG. 9, the amount of the power $P_{BB}$ (in watts (W)) used by the baseband (BB) processing unit of a transmitting device and based on the number $N_T$ of the antennas (e.g., transmitting (TX) antennas) of the transmitting device is represented with respect to two instances of g=5Gflop/W and 50Gflop/W in Equation 7. That is, as the number $N_t$ of the antennas rises, the amount of the power $P_{BB}$ increases proportionately. A number K of receiving devices is 40, and a bandwidth B of a signal transmitted by transmitting device is 10 MHz.

A line illustrated in FIGS. 10 to 13 may indicate a result of a simulation, and '+', '*', 'x', and other symbols known to one of ordinary skill in the art may indicate a result of a mathematical analysis being conducted.

Figure 10:
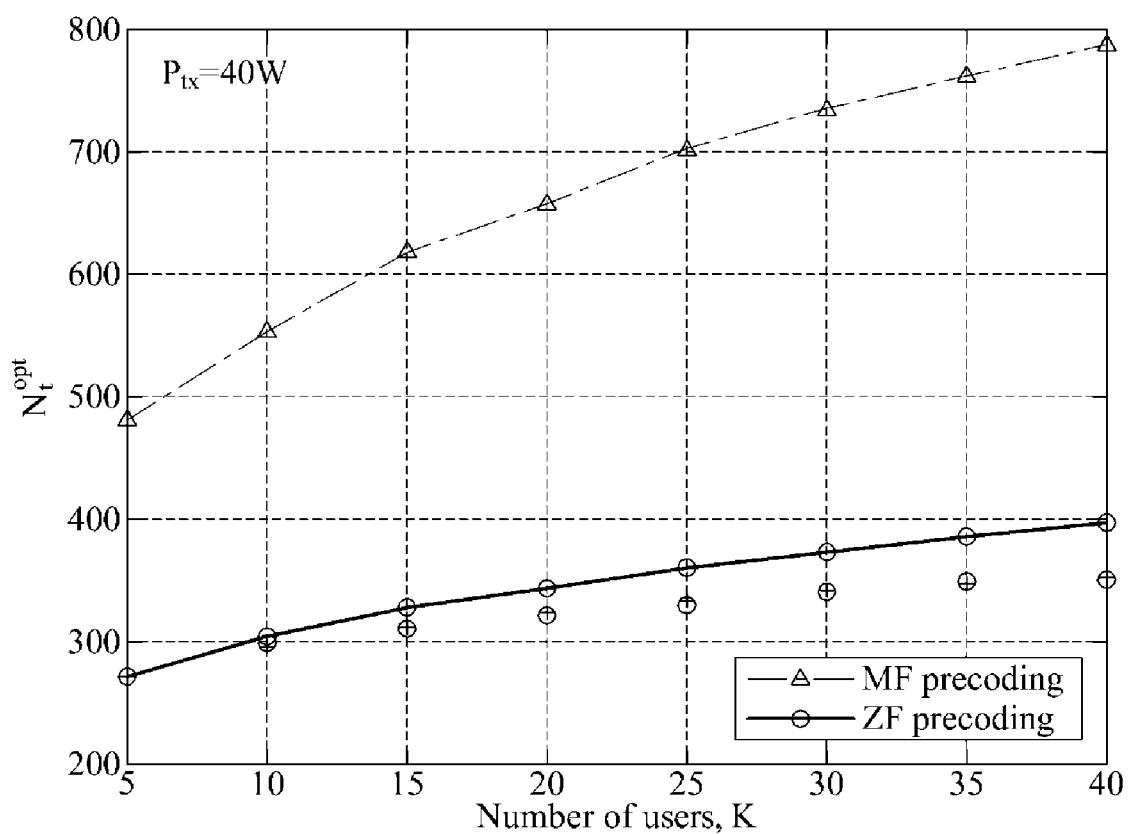
FIG. 10 is a graph illustrating an example of an optimal number of antennas based on a number of receiving devices.

FIG. 10 is a graph illustrating an example of an optimal number of antennas based on a number of receiving devices. Referring to FIG. 10, the optimal number $N_t^{opt}$ of the antennas of a transmitting device to be used to maximize an EE of the transmitting device increases proportionately based on the number K of the receiving devices or users, and whether MF precoding or ZF precoding is used. A total amount of power $P_{tx}$ transmitted by the transmitting device is 40 W, and a total number $N_t^{total}$ of the antennas of the transmitting device is 1000. Also, when the ZF precoding is used, '+' indicates a result of an analysis derived from Equation 13. In this example, the higher the optimal number $N_t^{opt}$ of the antennas becomes than the number K of the receiving devices, the closer the result of the analysis and a result of a simulation (e.g., a line for ZF precoding) become to each other.

Figure 11:
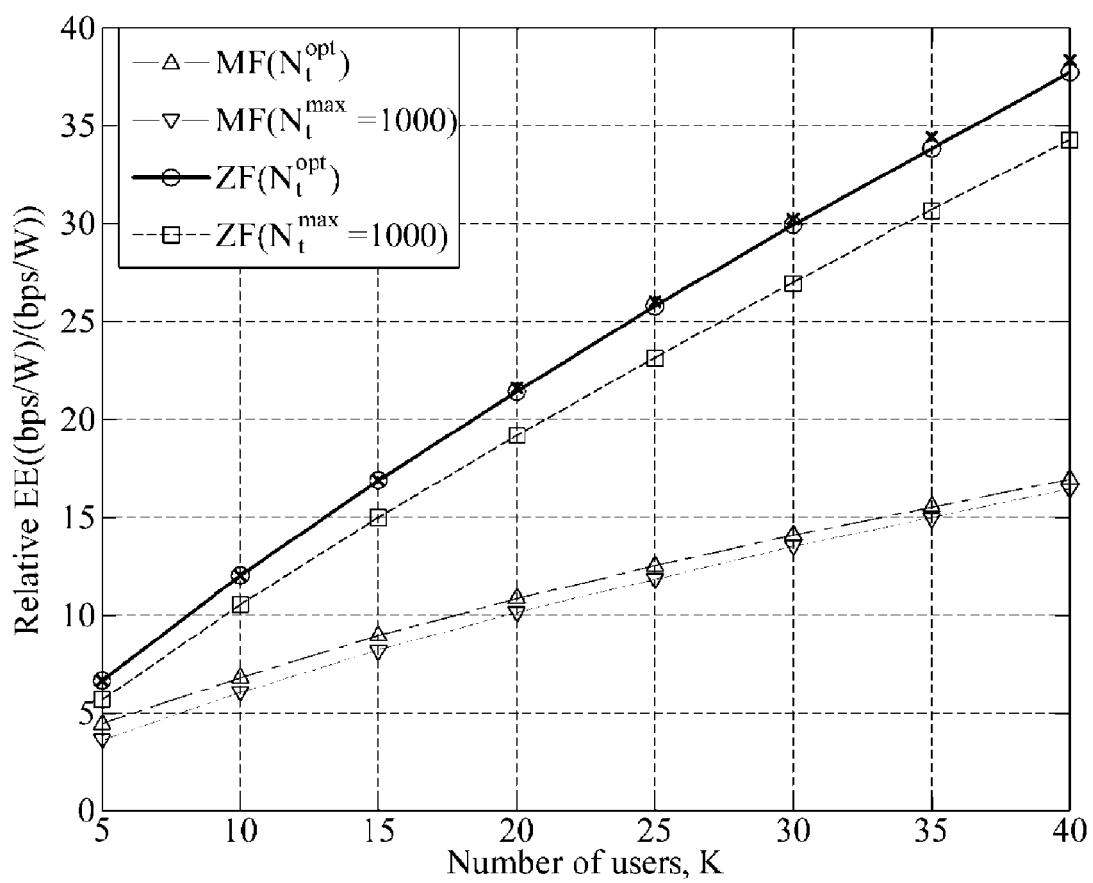
FIG. 11 is a graph illustrating an example of an energy efficiency based on a number of receiving devices.

FIG. 11 is a graph illustrating an example of an energy efficiency based on a number of receiving devices. Also, FIG. 11 illustrates a result of a simulation indicating an amount of energy efficiency achieved when a number $N_t^{opt}$ of antennas of a transmitting device to be used to maximize an EE of the transmitting device is selected randomly, compared to when a total number $N_t^{max}$ of the antennas of the transmitting device is selected.

Referring to FIG. 11, the energy efficiency EE (in bits per second over watts (bps/W), over bps/W) of the transmitting device increases proportionally based on the number K of the receiving devices or users, whether MF precoding or ZF precoding is used, and whether the number $N_t^{opt}$ or the total number $N_t^{max}$ of the antennas of the transmitting device is selected. A total amount of power $P_{tx}$ transmitted by the transmitting device is 40 W, and the total number $N_t^{max}$ of the antennas of the transmitting device is 1000. When the number K of the receiving devices is 10, and the ZF precoding is used, the energy efficiency EE may be improved by about 13%. In this example, 'x' indicates a result of an analysis calculated according to Equation 11, and may be similar to a result of a simulation, e.g., lines for ZF precoding.

Determining a condition satisfying high energy efficiency of a large scale-MIMO random antenna selection may be of importance. For example, the method described herein may benefit from higher energy efficiency when one or more RF front-end processing units of a transmitting device uses more power, or a total amount of power transmitted by the transmitting device is lower. In this example, using the method described herein may achieve high energy efficiency when the amount of the power used by the RF front-end processing units is relatively higher than an amount of power used by one or more PAs.

Figure 12:
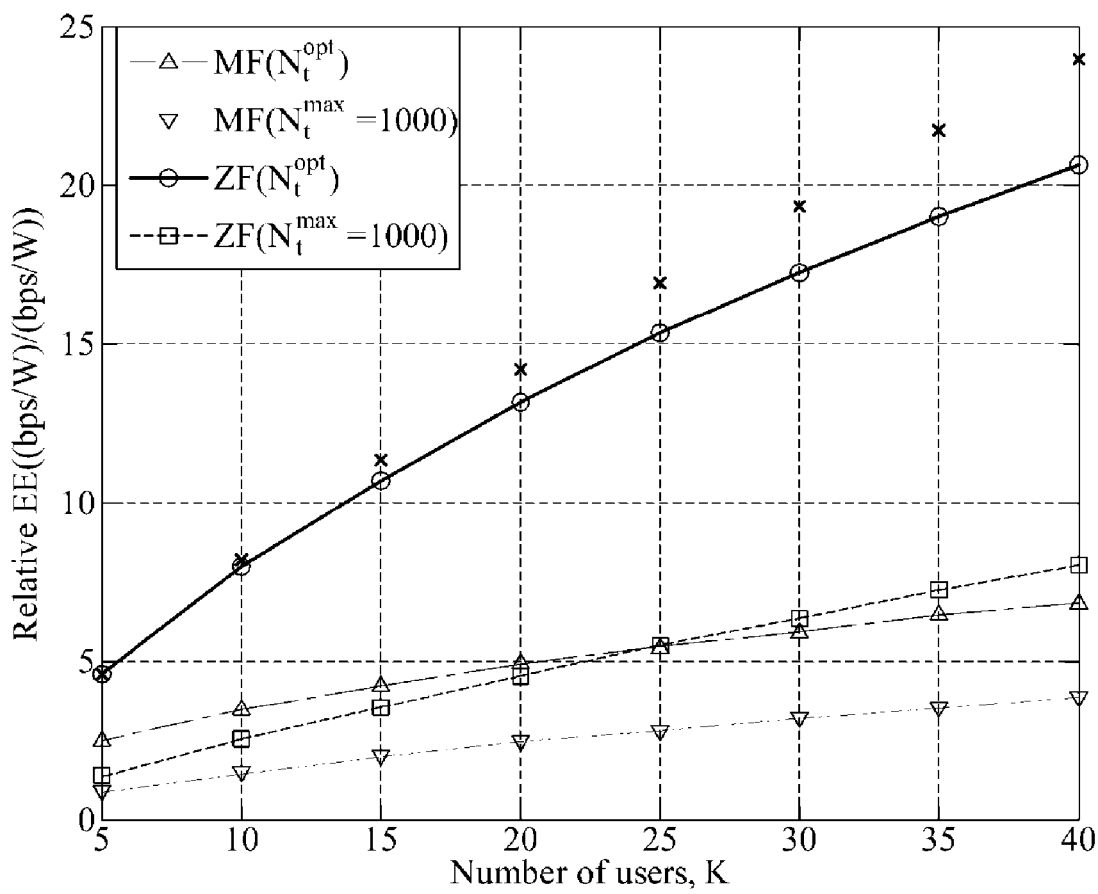
FIG. 12 is a graph illustrating an example of an energy efficiency based on a number of receiving devices when an amount of power used by a radio frequency (RF) front-end processing unit is high.

FIG. 12 is a graph illustrating an example of an energy efficiency based on a number of receiving devices when an amount of power used by an RF front-end processing unit is high. Referring to FIG. 12, a total amount of power $P_{tx}$ transmitted by a transmitting device is 40 W, and a total number $N_t^{max}$ of antennas of the transmitting device is 1000. Also, g(Gflops/W) is 5Gflop/W, and the amount of the power P RFfront used by one or more RF front-end processing units of the transmitting device is 974 milliwatts (mW). This amount of the power $P_{RFfront}$ may be relatively high, and the amount of the power $P_{RFfront}$ and an amount of power used by a baseband processing unit of the transmitting device may be 10 times greater than an amount of power used conventionally. When the number K of the receiving devices is 10, and ZF precoding is used, the energy efficiency EE may be increased by about 217%.

Figure 13:
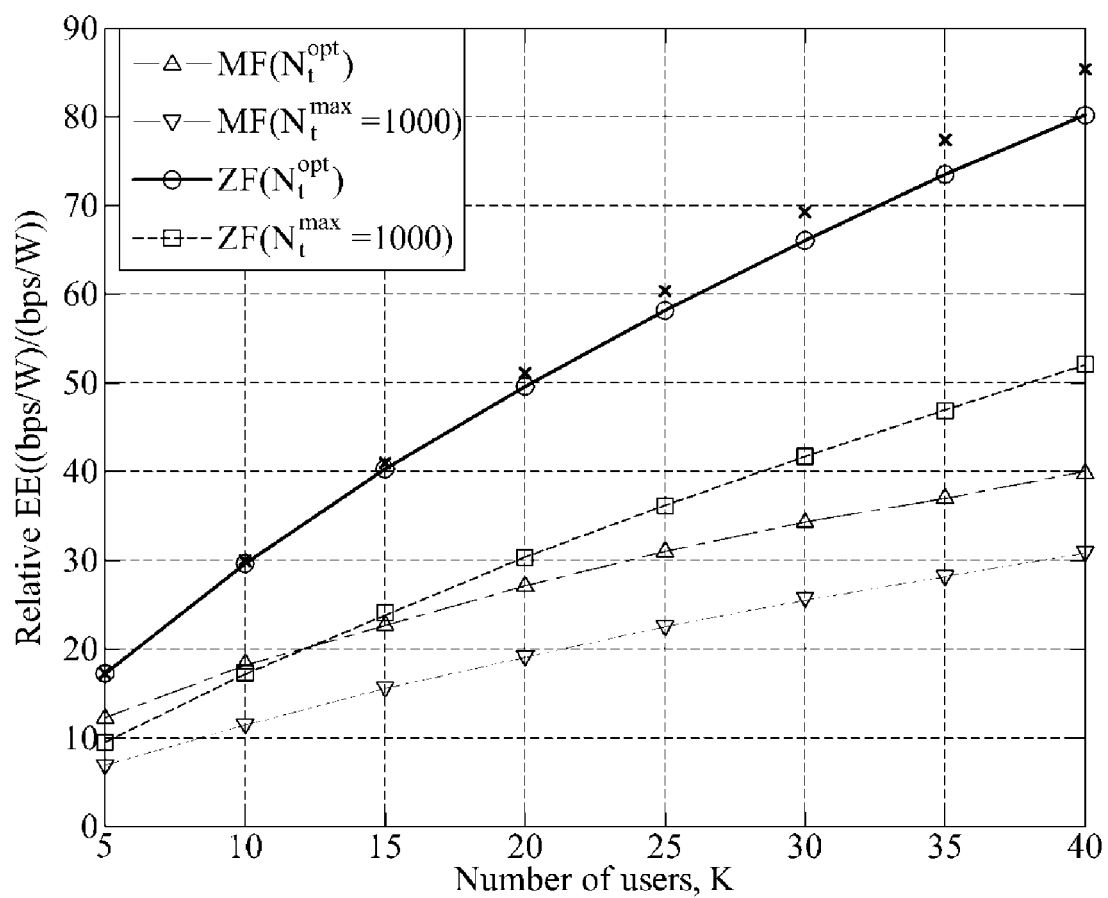
FIG. 13 is a graph illustrating an example of an energy efficiency based on a number of receiving devices when a total amount of power transmitted by a transmitting device is low.

FIG. 13 is a graph illustrating an example of an energy efficiency based on a number of receiving devices when a total amount of power transmitted by a transmitting device is low. Referring to FIG. 13, the energy efficiency EE of a transmitting device is illustrated when the total amount of the power $P_{tx}$ is reduced to 10 W while an amount of power used by one or more RF front-end processing units of the transmitting device and an amount of power used by a baseband processing unit of the transmitting device are maintained. When the number K of the receiving devices is 10, and ZF precoding is used, the energy efficiency EE may be improved by about 74%.

A degree by which the energy efficiency EE is enhanced through the method described herein is shown in the following example of Table 2:

|   | $P_{1x}=40W,P_{sum1}$ | | | $P_{1x}=40W,P_{sum2}$ | | | $P_{1x}=10W,P_{sum1}$ | | |
|---|---|---|---|---|---|---|---|---|---|
| K | K=10 | K=20 | K=30 | K=10 | K=20 | K=30 | K=10 | K=20 | K=30 |
| ZF | 13% | 12% | 11% | 217% | 191% | 173% | 74% | 65% | 59% |
| MF | 13% | 6% | 4% | 140% | 104% | 88% | 59% | 41% | 35% |

In Table 2, $P_{sum1}$ denotes g(gflop/W)=50Gflop/W, $P_{RF_{front}}$=97.5 mW, and $P_{sum2}$ denotes g(Gflop/W)=5Gflop/W, $P_{RF_{front}}$=975 mW.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a terminal or device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a number of antennas, the method comprising:
    calculating a power used by a transmitting device;
    calculating a channel capacity of the transmitting device;
    determining a number of antennas of the transmitting device to be used based on the power and the channel capacity; and
    selecting one or more antennas of the transmitting device to be used that correspond to the determined number of the antennas of the transmitting device, randomly from a total number of antennas in response to the determined number of the antennas of the transmitting device being greater than or equal to a predetermined value.

2. The method of claim 1, further comprising:
    determining the number of the antennas to maximize an efficiency of the transmitting device based on the power and the channel capacity.

3. The method of claim 1, wherein the power used by the transmitting device comprises a power used by a power amplifier, a power used by a baseband processing unit, and a power used by a radio frequency (RF) front-end processing unit, of the transmitting device.

4. The method of claim 3, wherein the power used by the RF front-end processing unit comprises a power used by a mixer, or a transmitting filter, or a digital to analog converter (DAC), or any combination thereof, of the RF front-end processing unit.

5. The method of claim 1, further comprising:
    selecting one or more antennas of the transmitting device to be used that correspond to a predetermined value, randomly from the antennas in response to the number of antennas being less than the predetermined value.

6. The method of claim 1, further comprising:
    receiving, periodically, the power and the channel capacity from a receiving device; and
    adjusting the number of antennas to be used to maximize an Energy Efficiency (EE) based on the power and the channel capacity.

7. A method of determining a number of antennas, the method comprising:
    extracting at least a parameter of a transmitting device and a parameter of a receiving device;
    determining a number of antennas of the transmitting device to be used to maximize an efficiency of the transmitting device based on at least one of the parameters; and
    selecting one or more antennas of the transmitting device to be used that correspond to the determined number of the antennas of the transmitting device, randomly from a total number of antennas in response to the determined number of the antennas of the transmitting device being greater than or equal to a predetermined value.

8. The method of claim 7, wherein the parameters comprise a power transmitted by the transmitting device.

9. The method of claim 7, wherein the parameters comprise a bandwidth of a signal transmitted by the transmitting device.

10. The method of claim 7, wherein the parameters comprise a number of receiving devices included in a cell coverage area of the transmitting device.

11. The method of claim 7, wherein the parameters comprise a power used by a radio frequency (RF) front-end processing unit of the transmitting device.

12. The method of claim 7, wherein the parameters comprise a power used by a baseband processing unit of the transmitting device.

13. The method of claim 7, further comprising:
    extracting the number of the antennas that corresponds to at least one of the parameters, from a lookup table.

14. The method of claim 7, wherein the parameters comprise a power used by the transmitting device.

15. The method of claim 7, wherein the parameters comprise a number of antennas of the receiving device communicating with the transmitting device.

16. The method of claim 7, wherein the parameters comprise a noise power in a bandwidth of a signal transmitted by the transmitting device.

17. The method of claim 7, further comprising:
    selecting one or more antennas of the transmitting device to be used that corresponds to a predetermined value, randomly from the antennas in response to the number of antennas being less than the predetermined value.

18. The method of claim 7, further comprising:
    receiving, periodically, various parameters from a receiving device; and
    adjusting the number of antennas to be used to maximize an Energy Efficiency (EE) based on the received various parameters.

19. An apparatus that determines a number of antennas, the apparatus comprising:
    a power calculating unit configured to calculate a power used by a transmitting device;
    a channel capacity calculating unit configured to calculate a channel capacity of the transmitting device;

an antenna number determining unit configured to determine a number of antennas of the transmitting device to be used based on the power and the channel capacity; and an antenna selecting unit configured to select one or more antennas of the transmitting device to be used that correspond to the determined number of the antennas of the transmitting device, randomly from a total number of antennas in response to the determined number of the antennas of the transmitting device being greater than or equal to a predetermined value.

\* \* \* \* \*